June 12, 1934.    T. E. BUCKNER    1,962,980
CONVEYER BELT
Filed Aug. 8, 1933    2 Sheets-Sheet 1
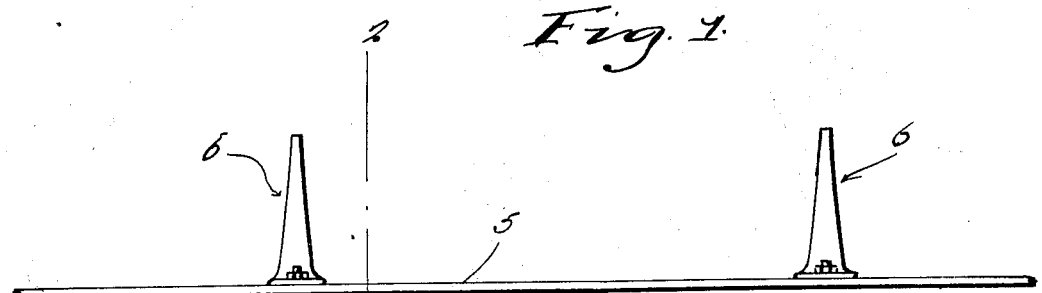
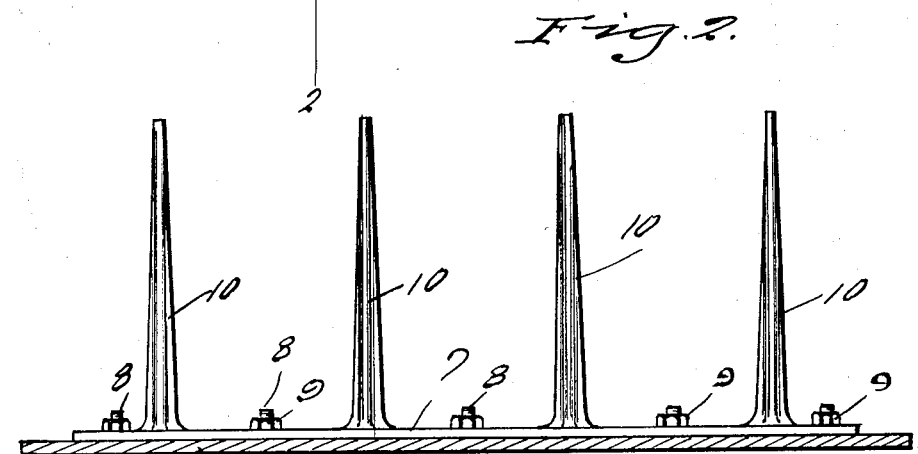
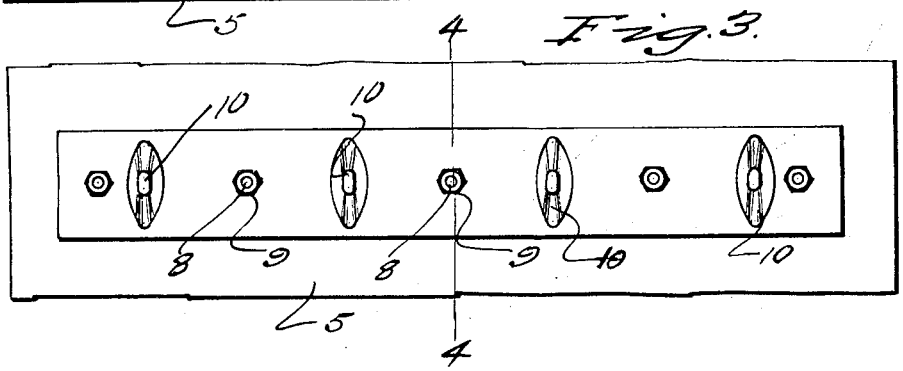
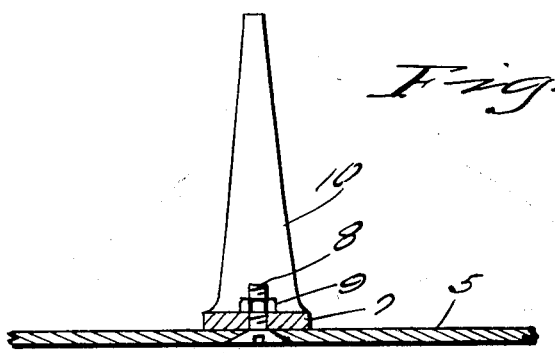
Inventor
Thomas E. Buckner
By Clarence A. O'Brien
Attorney June 12, 1934.  T. E. BUCKNER  1,962,980
CONVEYER BELT
Filed Aug. 8, 1933  2 Sheets-Sheet 2

Inventor
Thomas E. Buckner
By Clarence A. O'Brien
Attorney

Patented June 12, 1934

1,962,980

UNITED STATES PATENT OFFICE 1,962,980

CONVEYER BELT

Thomas E. Buckner, Burkburnett, Tex.

Application August 8, 1933, Serial No. 684,273

1 Claim. (Cl. 198—198)

This invention appertains to new and useful improvements in conveyer belts, and more particularly to a novel spike mount for conveyer or distributor belts.

The principal object of the present invention is to provide a spike mount for conveyer belts wherein a whole group of spikes can be applied as a unit to the belt, thus reducing labor and expense in equipping the belt with spikes.

Another important object of the invention is to provide a spike which is of elongated construction in cross section at its base portion in a direction consistent with the direction of force to be applied against the same.

During the course of the following specification and claim, other important objects and advantages of the invention will become apparent to the reader.

In the drawings:—

Figure 1 represents a side elevational view of a belt equipped with a pair of the units, each of which composes the present invention.

Figure 2 represents a side elevational view of one of the spike assemblies secured to a belt.

Figure 3 represents a top plan view of one of the spike assemblies.

Figure 4 represents a sectional view taken substantially on line 4—4 of Figure 3.

Figure 5:
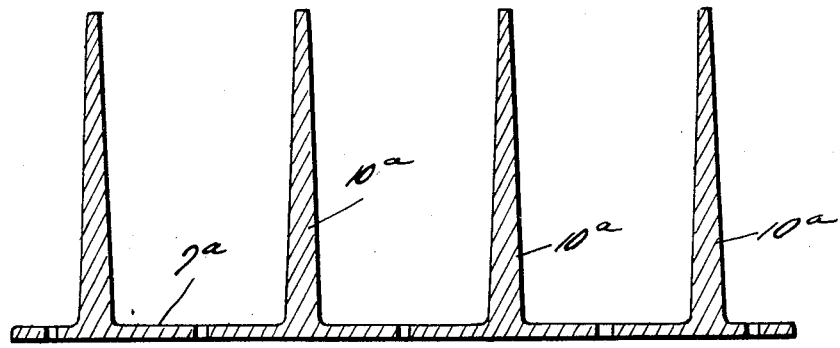
Figure 5 represents a longitudinal sectional view through a slightly modified form of the present invention.

Referring to the drawings wherein like numerals designate like parts, it can be seen in Figure 1 that numeral 5 represents the conveyer belt and that numeral 6 generally refers to spike assemblies, each of which discloses the present invention.

Figure 2 shows that the assembly consists of an elongated base plate 7 secured to the belt 5 by bolts 8 and nuts 9.

Projecting upwardly from this plate 7 are the spikes 10 equally spaced apart and each being of substantially ovate shape in cross section throughout its entire length and being tapered from its base end outwardly toward its free end.

Figures 5, 7, 8 and 9 disclose a slightly modified form of the invention wherein the base plate 7a is provided with outwardly extending spike elements 10a.

Figure 7:
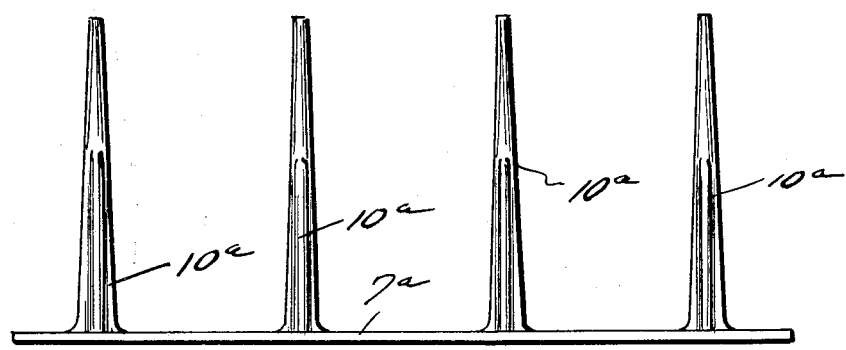
Figure 7 represents a side elevational view of the modified assembly shown in Figure 5.
Figure 8:
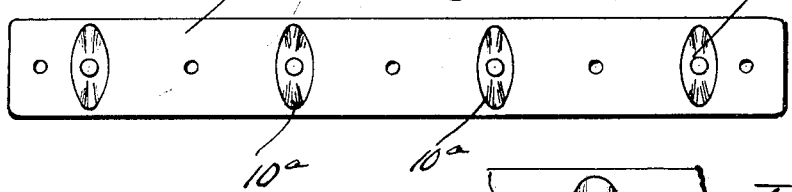
Figure 8 represents a top plan view of the modified assembly shown in Figure 7.
Figure 9:
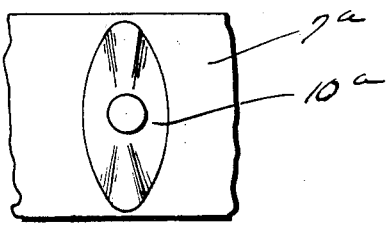
Figure 9 represents a fragmentary top plan enlarged view of the modified assembly, showing one of the spikes.
Figure 6:
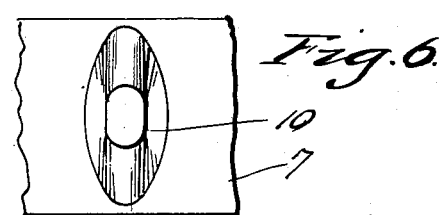
Figure 6 represents an enlarged fragmentary top plan view showing one of the spike elements.

The base plate 7a is provided with openings to accommodate the bolts 8 and as is clearly shown in Figures 7, 8 and 9, each spike element 10a is of substantially ovate shape in cross section for about one-half of its length, starting from its base end, inwardly and from its midway point outwardly to its free end, the spike takes on a circular shape in cross section, although the spike tapers outwardly from the base plate 7 gradually toward its free end.

While the foregoing specification sets forth the invention in specific terms, it is to be understood that numerous changes in the shape, size and materials may be resorted to without departing from the spirit and scope of the invention as claimed hereinafter.

Having described the invention, what is claimed as new is:—

A conveyer belt spike comprising an elongated member having a thick belt attaching end and a relatively thin free end, the said elongated member being substantially ovate in shape at its belt attaching end and gradually tapering to its thin end consistently on the longitudinal axis of the said elongated member, the greatest distance transversely through the elongated member being on a line with the travel of the belt.

THOMAS E. BUCKNER.